Figure 2:
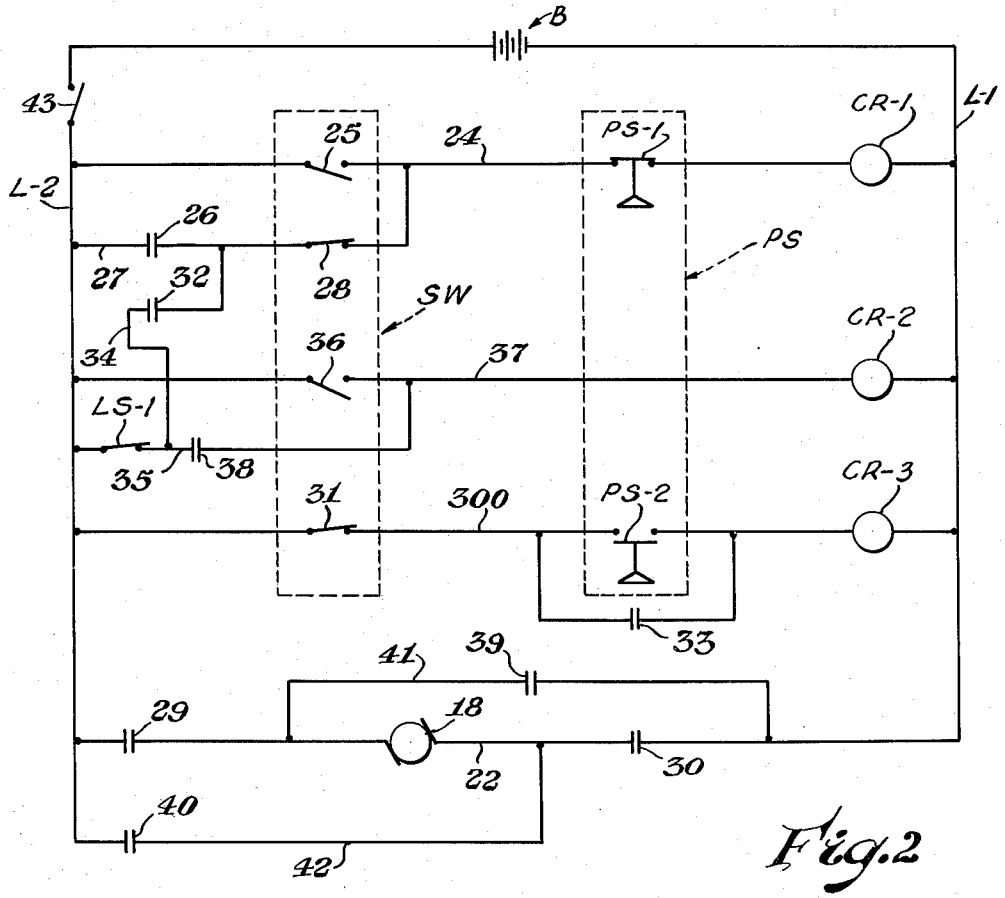

July 4, 1961 F. J. STINGEL ET AL 2,990,903
VEHICLE AUXILIARY BRAKE MECHANISM
Filed March 18, 1959

INVENTORS.
Frederick J. Stingel
BY Harold V. R. Parish

ATTORNEYS

United States Patent Office 2,990,903
Patented July 4, 1961

2,990,903
VEHICLE AUXILIARY BRAKE MECHANISM
Frederick J. Stingel, 803 Cleveland, and Harold V. R. Parish, 1302 Houghton St., both of Saginaw, Mich.
Filed Mar. 18, 1959, Ser. No. 800,291
8 Claims. (Cl. 180—82)

This invention relates to auxiliary braking mechanisms for motor vehicles and more particularly to a safety device which is operable to set the brakes of a vehicle automatically upon the driver's leaving the vehicle and thereby prevent inadvertent movement of an unattended vehicle.

Although most vehicles are equipped with hand or parking brakes or with other devices which may be set manually to prevent a vehicle from rolling down an incline when the vehicle operator leaves the vehicle, it is not uncommon for a careless person to leave his car without making use of such devices. As a consequence, it frequently happens that an unattended vehicle rolls down an incline and causes serious personal injuries or property damage, or both. This problem has become aggravated with the advent of automatic transmissions in vehicles because it now is possible for a vehicle operator to leave his car while the engine is running and the transmission engaged, thereby enabling an unattended vehicle to move even on a level surface.

The problems caused by careless drivers leaving their vehicles unattended have been recognized before and various proposals have been made to solve them, but such proposals have not been altogether satisfactory for a number of reasons. Most, if not all, auxiliary brake setting devices intended for use in conjunction with ordinary passenger cars have required the operator to manipulate a switch or other device upon his leaving the vehicle. These devices fail to recognize the basic problem involved, which is carelessness on the part of the operator. If all operators could be depended upon to manipulate some device to set the brakes before leaving the car, auxiliary safety devices could be dispensed with. However, if the careless person cannot be depended upon to set his hand brake or lock his transmission, then it hardly seems likely that he can be depended upon consciously to manipulate an auxiliary brake setting device. Accordingly, one of the principal objects of this invention is to provide apparatus for setting the brakes of a vehicle automatically upon the operator's leaving the vehicle.

Another disadvantage of known devices of the kind described is that they ordinarily are effective to apply the brakes initially, but then become and remain inactive. It is not uncommon for the hydraulic brake system of a vehicle to experience a reduction in the pressure applied through the hydraulic line to the brakes. Should this happen, the brakes may not be maintained applied with sufficient force to prevent the movement of an unattended vehicle with the consequent risk of injury and damage. Accordingly, another object of the invention is the provision of safety brake setting apparatus which is operable to compensate for any decrease in hydraulic braking pressure.

A further object of the invention is to provide brake setting apparatus of the kind referred to which is capable of being incorporated in a vehicle either as part of its original equipment or as an accessory and later attachment.

A still further object of the invention is to provide apparatus of the kind described which is so constructed and arranged as to be disabled from setting the brakes of a vehicle when the vehicle is in motion above a predetermined speed.

Another object of the invention is to provide such apparatus which is economical to manufacture and install and which is rugged and durable in use.

Figure 1:
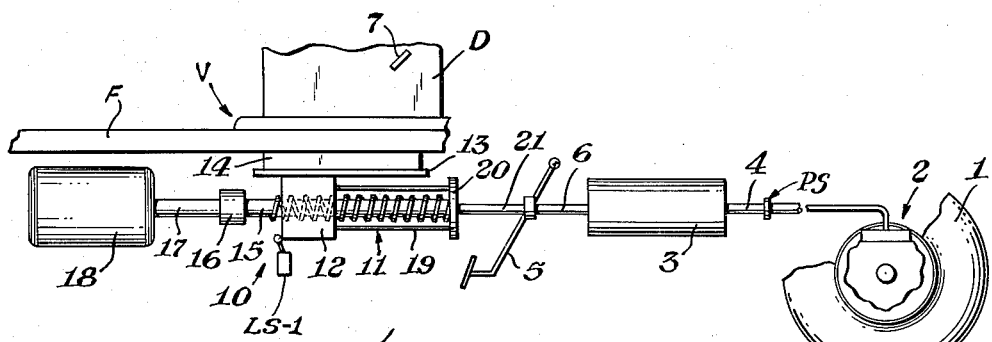

Other objects and advantages of the invention will be pointed out specifically or will become apparent from the following description when it is considered in conjunction with the appended claims and the accompanying drawings, in which:

FIGURE 1 is a diagrammatic view of apparatus constructed in accordance with the invention and installed on a vehicle having a hydraulic braking system; and FIGURE 2 is a schematic wiring diagram of electrical apparatus.

Apparatus constructed in accordance with the invention is adapted for use in conjunction with a conventional motor vehicle V having a number of ground engaging wheels 1 each of which is equipped with hydraulically actuated braking mechanism 2 of known construction and connected to a reservoir of hydraulic fluid such as a master cylinder 3 by means of hydraulic lines 4. The vehicle may be equipped with a foot operated brake pedal 5 which may be operated to effect movement of a piston assembly 6 mounted for movement relative to the master cylinder 3 in such manner as to apply and release the brakes 2 in a conventional manner. The vehicle also includes at least one door D through which a person may enter or leave the vehicle, the door having a latch (not shown) which is controlled by a manually operable handle 7 pivoted for rocking movements in the conventional manner. The parts described thus far are standard or conventional and form no part of the invention per se.

The auxiliary or safety braking mechanism formed in accordance with the illustrative embodiment of the invention is represented in the drawings generally by the reference character 10 and comprises an operating device 11 having an operative connection with the brake applying apparatus previously referred to so as to effect the application of braking force to the wheels 1. In the disclosed embodiment, the device 11 comprises a ball nut member 12 mounted for reciprocating movement in a slide 13 which may be fixed at any suitable point on the vehicle frame F by means of a bracket 14. Rotatably mounted within the ball nut member 12 is a screw element 15 which is connected by a coupling 16 to the armature shaft 17 of a 6 or 12 volt direct current, reversible motor 18 of known construction. The motor 18 may be connected to a battery B (see Figure 2) forming part of the standard equipment of the vehicle in such manner that the completion of a circuit to the motor will cause rotation of the shaft 17 in one direction or the other to cause movement of the ball nut 12 longitudinally of the screw 15. In a preferred construction, the ball nut 12 is equipped with a projecting cage structure 19 having a bearing plate 20 adapted to bear against an extension 21, forming a part of the piston assembly 6, and effect movement of the latter in its brake applying direction.

Means is provided for controlling and regulating the operation of the driving motor 18 and comprises power lines L-1 and L-2 connected at corresponding ends to the battery B and at the other ends to a line 22 in which the driving motor 18 also is connected. Across the lines L-1 and L-2 is connected a wire 24 in which is located a normally open switch 25. This switch preferably is part of a four pole gang switch SW mounted adjacent to the door handle 7 in such manner that all of the switches of the gang may be moved upon actuation of the handle 7. The switch 25 is adapted to be moved to its closed position when the door handle is manipulated from inside the vehicle to unlatch the door D. The wire 24 also includes one contact PS-1 of a two-pole pressure switch PS, the switch PS-1 normally being closed when no braking pressure exists in the hydraulic line 4. The wire 24 also has connected thereto a control relay CR-1 having a first normally open contact 26 located in a line 27 bridging the switch 25 and also containing a normally closed switch 28 of the gang. Upon the closing of the switch 25, by manipulation of the door handle 7 in a direction to open the door, the relay CR–1 is energized causing the contact 26 to close and remain closed even though the switch 25 thereafter may be opened by the return of the handle 7 to its neutral position.

The control relay CR–1 has two other normally open contacts, 29 and 30, both of which are located in the line 22 and both of which will be closed upon energization of the relay CR–1 so as to effect operation of the driving motor 18 in one direction of rotation. The motor 18 will continue to operate as long as the relay CR–1 is energized.

The arrangement of the parts described is such that, upon closing of the switch 25, the motor 18 is driven in such direction as to cause the operating member 11 to move in its brake applying direction and engage the piston assembly 6 to cause the application of braking force to the wheel brakes 2. As the brakes are applied, the hydraulic pressure will build up in the line 4 to a predetermined value whereupon the force responsive switch PS will be actuated to open the switch PS–1, thereby breaking the circuit to the relay CR–1 and causing the reopening of the contacts 29 and 30 and, consequently, stopping of the motor 18. The switch PS–1 is keyed to its companion switch PS–2 mounted in a line 300, the arrangement being such that when the switch PS–1 is open the switch PS–2 is closed and vice versa. Therefore, opening of the switch PS–1 causes closing of the switch PS–2. When the switch PS–2 is closed, current is supplied to a control relay CR–3 through a normally closed switch 31, the relay CR–3 also having two normally open contacts 32 and 33. The contact 33 bridges the pressure switch PS–2 and the contact 32 is located in a line 34 connected across the line 27 and a bridging line 35. As long as the pressure switch PS–2 and the switch 31 remain closed, the relay CR–3 will remain energized so as to prevent the possibility of the pressure switch contact PS–1 closing and reenergizing of the relay CR–1. Consequently, operation of the driving motor 18 in its brake applying direction is precluded and rupture of any part of the hydraulic system and damage to the motor are prevented.

If, at any time after the setting of the brakes by the apparatus just described, the fluid pressure in the line 4 should decrease due to the presence of air in the system or a leak, for example, the pressure switch PS–2 will open and the companion switch PS–1 will close, thereby reenergizing the driving motor 18 to effect movement of the operating device 11 until such time as the pressure in the line again closes the switch PS–2. Thus, the apparatus is capable of compensating for a reduction in brake applying hydraulic force even after a vehicle operator has left the vehicle by starting and stopping the motor 18 in accordance with the pressure in the system.

The compensating apparatus just described requires that the relay CR–3 be energized constantly from the battery B as long as the switch PS–2 is closed. If desired, however, the purely electrical relay CR–3 may be replaced by an electro-mechanical latching relay of known construction which will automatically disconnect itself from the circuit after the switch PS–2 closes, but which will maintain the relay contacts 29 and 30 closed. This arrangement will enable the compensating apparatus to function exactly as has been described, but will not cause a drain on the battery except during those periods when the driving motor 18 may be operated through the compensating circuit.

When the vehicle operator reenters the vehicle, it will be necessary for him to manipulate the handle 7 in such manner as to close the switch 36 which also forms part of the gang switch SW. Closing of the switch 36 will supply current via a line 37 in which is also connected a control relay CR–2. The relay CR–2 has three normally open contacts 38, 39, and 40. The contact 38 is located in the line 35 which bridges the switch 36 and will be closed upon energization of the relay CR–2. The relay contact 39 is located in a line 41 bridging the contact 30 and the motor 18, and the contact 40 is located in a line 42 bridging the contact 40 and the motor 18. The closing of the switch 36 energizes the relay CR–2 and closes each of its normally open contacts, thereby supplying current to the driving motor 18. The arrangement of the lines 41 and 42 is such, however, that the direction of rotation of the motor shaft 17 is opposite to its direction of rotation as previously described, whereby the operating member 11 is driven in a direction away from its brake applying position. The motor 18 will continue to run in its reverse direction until such time as the ball nut member 12 engages a normally closed limit switch LS–1 mounted in the path of the ball nut member. The switch LS–1 is connected in the line 35 and, when opened, breaks the circuit to the relay CR–2 and hence deenergizes the motor 18. When the motor 18 is deenergized in the manner described, the operating device 11 will be out of engagement with the piston assembly 6 and will exert no force on the brake applying mechanism.

In order to prevent the application of a vehicle's brake by inadvertent manipulation of the door handle during operation of the vehicle, means is provided for disabling the auxiliary braking apparatus when the vehicle is traveling at more than a predetermined rate of speed. The disabling means preferably comprises a centrifugal switch 43 which may be mounted on a part of the vehicle which rotates at a speed proportional to the rate of travel of the vehicle. The vehicle part to which the switch is connected may be the engine drive shaft or the speedometer cable, for example, and the construction of the switch 43 is such that it normally is closed when the vehicle is at rest or moving at an extremely slow speed. Upon faster movement of the vehicle, however, the rotation of the part on which the switch 43 is mounted will cause the switch to open, thereby disabling the entire circuit of the auxiliary braking apparatus and preventing any possibility of the application of the brakes by the auxiliary mechanism.

The disclosed embodiment is representative of a presently preferred form of the invention but is intended to be illustrative rather than definitive thereof. The invention is defined in the claims.

We claim:

1. Auxiliary parking braking mechanism adapted for use in conjunction with wheeled vehicles having wheel brakes, means for applying and releasing said brakes, and foot operated pedal means for actuating said applying and releasing means, said mechanism comprising operating means independent of said pedal means having an operative connection with said applying and releasing means; means mounting said operating means for movements towards and away from brake applying position; a source of power mounted on said vehicle; driving means connected to said operating means for moving the latter; manual means interconnecting said power source and said driving means for initiating operation of the latter to drive said operating means to brake applying position; force responsive control means connected to said driving means and having an operative connection with said operating member for stopping said driving means and for restarting said driving means to drive said operating means toward said brake applying position in accordance with the pressure exerted by said operating member on said applying and releasing means; and means connected to said driving means for disabling operation of the latter during movement of said vehicle above a predetermined speed.

2. Auxiliary braking mechanism adapted for use in conjunction with wheeled vehicles having a door, manipulable handle means for opening said door, wheel brakes, a brake pedal, and means operable by said pedal for applying and releasing said brakes, said mechanism comprising operating means independent of said pedal and having an operative connection with said applying and releasing means; means mounting said operating means for movement towards and away from brake applying position; a source of power; driving means connected to said operating means for moving the latter; means interconnecting said driving means and said power source and operable in response to manipulation of said handle means for initiating operation of said driving means; and force responsive control means operatively interconnecting said power source and said driving means operable to terminate operation of the latter in response to the application of sufficient force on said applying and releasing means by said operating means to apply said brakes said control means including apparatus connected to said power source responsive to a decrease in the force applied by said operating means to reinitiate operation of said driving means and effect additional movement of said operating means towards said brake applying position.

3. The mechanism set forth in claim 2 including means interconnecting said power source and said driving means operable to disable operation of the latter during movement of said vehicle above a predetermined speed.

4. In a vehicle having hydraulic wheel brakes, a reservoir of hydraulic fluid, a fluid line interconnecting said reservoir and said brakes, and actuator means for applying braking force to said brakes via hydraulic fluid in said reservoir and said line, the combination of operating means having an operative connection with said actuator means; means mounting said operating means for movements to and from brake applying position; driving means connected to said operating means for moving the latter; control means connected to said driving means for initiating operation of the latter to drive said operating means to its brake applying position; and force responsive regulating means in said hydraulic line and connected to said driving means operable in response to the establishment of braking force in said line to interrupt operation of said driving means and to reinitiate operation of the latter and drive said operating means toward its brake applying position in the event of a reduction in braking force in said line.

5. The construction set forth in claim 4 wherein said control means is manually operable.

6. The construction set forth in claim 5 wherein said vehicle includes a door having a latch operated by movement of a handle, and wherein said control means is operated by movement of said handle.

7. The construction set forth in claim 4 wherein said vehicle includes means movable at a rate proportional to the speed of said vehicle, and disabling means interconnecting said movable means and said driving means for disabling operation of the latter at a predetermined speed of said vehicle.

8. Auxiliary parking braking mechanism adapted for use in conjunction with wheeled vehicles having wheel brakes, means for applying and releasing said brakes, and foot operated pedal means for actuating said applying and releasing means, said mechanism comprising operating means independent of said pedal means having an operative connection with said applying and releasing means; means mounting said operating means for movements towards and away from brake applying position; a source of power; driving means connected to said operating means for moving the latter; manual means interconnecting said power source and said driving means for initiating operation of the latter to drive said operating means to brake applying position; and force responsive control means connected to said driving means and having an operative connection with said operating means for stopping said driving means and for restarting said driving means to drive said operating means toward said brake applying position in accordance with the pressure exerted by said operating member on said applying and releasing means.

References Cited in the file of this patent

UNITED STATES PATENTS

| | | |
|---|---|---|
| 1,501,146 | Strother | July 15, 1924 |
| 2,190,120 | Kohler | Feb. 13, 1940 |
| 2,493,377 | Zeilman | Jan. 3, 1950 |
| 2,734,590 | Hays | Feb. 14, 1956 |
| 2,804,160 | Rashid | Aug. 27, 1957 |